(12) United States Patent
Hansen et al.

(10) Patent No.: US 11,637,932 B2
(45) Date of Patent: Apr. 25, 2023

(54) METHOD FOR OPTIMIZING SPEECH PICKUP IN A SPEAKERPHONE SYSTEM

(71) Applicant: EPOS Group A/S, Ballerup (DK)

(72) Inventors: Anders Røser Hansen, Ballerup (DK); Poul Peder Hestbek, Ballerup (DK); Casper Fynsk, Ballerup (DK)

(73) Assignee: EPOS Group A/S, Ballerup (DK)

( * ) Notice: Subject to any disclaimer, the term of this patent is extended or adjusted under 35 U.S.C. 154(b) by 0 days.

(21) Appl. No.: 17/381,690

(22) Filed: Jul. 21, 2021

(65) Prior Publication Data

US 2022/0030113 A1   Jan. 27, 2022

(30) Foreign Application Priority Data

Jul. 22, 2020 (EP) .................... 20187154

(51) Int. Cl.
*H04M 3/56* (2006.01)
*H04M 1/60* (2006.01)
*H04R 1/32* (2006.01)
*H04S 7/00* (2006.01)

(52) U.S. Cl.
CPC ......... *H04M 3/568* (2013.01); *H04M 1/6025* (2013.01); *H04R 1/326* (2013.01); *H04S 7/301* (2013.01); *H04S 7/305* (2013.01); *H04S 7/40* (2013.01); *H04M 2203/509* (2013.01); *H04R 2201/003* (2013.01)

(58) Field of Classification Search
CPC .......... H04M 3/56; H04M 1/60; H04M 9/082; H04R 1/32
USPC ............ 379/406.05, 388.01, 388.02, 420.01, 379/433.02
See application file for complete search history.

(56) References Cited

U.S. PATENT DOCUMENTS

| 10,111,000 B1* | 10/2018 | Ho ....................... G10L 21/0272 |
| 2006/0067500 A1* | 3/2006 | Christofferson ........ H04M 3/56 379/202.01 |
| 2006/0269080 A1* | 11/2006 | Oxford ................ H04R 29/007 381/92 |
| 2010/0185308 A1* | 7/2010 | Yoshida .................... H04S 7/00 381/119 |

\* cited by examiner

*Primary Examiner* — Yosef K Laekemariam
(74) *Attorney, Agent, or Firm* — Birch, Stewart, Kolasch & Birch, LLP (57) ABSTRACT

A method (S100) for optimizing speech pickup in a speakerphone system, wherein the speakerphone system comprises a microphone system placed in a specific configuration, wherein the method comprising receiving (S10) acoustic input signals (12) by the microphone system, processing (S20) said acoustic input signals (12) by using an algorithm (100) for focusing and steering a selected target sound signal towards a desired direction, and transmitting (S30) an output signal (13) based on said processing.

23 Claims, 11 Drawing Sheets

METHOD FOR OPTIMIZING SPEECH PICKUP IN A SPEAKERPHONE SYSTEM

The present disclosure relates to loudspeaker system. The disclosure relates specifically to a loudspeaker system comprising a microphone system for picking up speech at a distance from the talker, often referred to as a speakerphone. The disclosure relates further to a method for room optimizing microphone signal performance by mixing various DIR filter outputs with e.g. omni and enhanced omni responses based on input from reverb estimator.

The description given herein may e.g. be useful in applications such as handsfree telephone systems, mobile telephones, teleconferencing systems (e.g. speakerphones), headphones, headsets, public address systems, gaming devices, karaoke systems, classroom amplification systems, etc.

The sound quality from any microphone system meant for picking up speech at a distance from the talker is greatly affected by the conditions of the room wherein the system is placed. In hard (relatively high amount of reverb) rooms speech intelligibility can be significantly impaired. A method to counter this is to make the microphone system directional primarily picking up sound from a narrow angle (high directionality index) in the direction of the talker thereby excluding some of the reflected sound. The cost of this is complexity and amplified microphone noise. In very soft rooms (very low reverb time) there will in some cases be no benefit at all from directionality. Using a directional system under these circumstances will only add noise compared to an omnidirectional system and therefore offer worse performance overall.

Simply using a directional system with fixed directionality for all rooms is a suboptimal solution in most situations.

With the above description in mind, then, an aspect of the present disclosure is to provide a method and system for optimizing microphone signal performance based on conditions of a room wherein the system is placed, which seeks to mitigate, alleviate or eliminate one or more of the above-identified deficiencies in the art and advantages singly or in combination.

According to an aspect, a method for optimizing speech pickup in a speakerphone is provided. The speakerphone comprises a microphone system placed in a specific configuration. The term specific pattern is meant as a predefined pattern so that the processing of sound signals from the microphone system may be performed reliably. The method comprising receiving acoustic input signals by the microphone system, processing said acoustic input signals by using an algorithm (100) for focusing and steering a selected target sound pickup direction towards a desired direction and transmitting an output signal based on said processing. By focusing is meant that a directional signal is mixed at a given ratio with an omnidirectional signal so as to change the degree of focusing the sound pick up from a sound source external to the device, e.g. speakerphone.

The microphone system preferably provides output signals that either themselves are directional and omnidirectional, or directional and omnidirectional are at least derivable from signals from the microphone system. A directional and an omnidirectional output signal may be provided to the mixing unit and/or a processing unit. The directional signal is preferably adaptable so that the directional signal has a main pickup direction that may be adapted to mainly pickup sound from a specific direction relative to the housing, e.g. speakerphone housing. The directional signal may be established via two or more individual microphones of the microphone system. Further microphones may be utilized. An external microphone system may be connected to a speakerphone as described herein. Such an external microphone system may be used in reducing reverberation picked up by the microphone system in the speakerphone.

Noise reduction may be applied to sound signals picked up by the microphone system of a speakerphone. Noise reduction may be a signal-channel noise reduction system.

A speakerphone as described herein may be used in conjunction with a video system e.g. for videoconferencing. Those two components may be in communication with a computer device or the like, alternatively either device may include processing and software so as to enable communication via a softphone system.

In one aspect, the processing comprises optimizing the target sound signal while simultaneously rejecting sound signals coming from other directions, allowing the pickup of speech from any angle desired, relative to the speakerphone system.

In one aspect, the method comprises the step of analyzing the content of the received sound signal in all directions, and automatically selecting the direction of interest, the target sound signal.

In one aspect, the processing comprises determining a mixing ratio based on a room characteristic and mixing a directional sound signal with an omnidirectional response signal based on the determined mixing ratio. A room characteristic may be obtained by a measurement, e.g. performed using the microphone system. A room characteristic may be input to the system as a setting by a user. A room characteristic may, as disclosed herein, may be determined and updated continuously. At least one parameter of a room characteristics may relate to possible reverberation levels in the room in which a speakerphone is placed. A room characteristic may be determined based on a measurement of reverberation by a speakerphone. The room characteristic may be continuously updated. This could be via a measurement by analysis of sound recorded via the microphone system In one aspect, the method comprising continuously updating the mixing ratio. The processing may be constituted by the mixing as described herein. During use the speakerphone is placed in a room, usually left on a table or the like.

In one aspect, a data processing system comprising a processor and program code means for causing the processor to perform at least some of the steps of the method disclosed above.

In one aspect, computer program comprising instructions which, when the program is executed by a computer, cause the computer to carry out the steps of the method disclosed above.

According to another aspect, a system for optimizing speech pickup in a speakerphone of the system, comprising an input unit comprising a microphone system placed in a specific configuration and adapted for receiving an audio input signal and providing an electric audio input signal, a processing unit adapted for by using an algorithm for focusing and steering a selected target sound pickup direction towards a desired direction and an output unit for providing an output signal perceivable by a user as sound representative of said electric acoustic input signal or a processed version thereof.

In one aspect, the microphone system comprises at least six microphones. In one aspect, the microphones are low-noise digital MEMS microphones are placed in a specific configuration optimized to enable speech to be picked up from any angle.

In one aspect, the microphone system is engaged, and the advanced signal processing algorithms are applied, and the directional pattern is focused into a tight beam.

In one aspect, the processing unit is adapted for optimizing the target sound signal while simultaneously rejecting sound signals coming from other directions, allowing the pickup of speech from any angle desired.

In one aspect, the processing unit is adapted for analyzing the content of the received sound signal in all directions and automatically selecting the direction of interest, the target sound signal.

In one aspect, the speakerphone system is adapted to automatically steer a focused beam to the desired direction for the target signal, even if the target sound signal changes position. Steering a directional signal is also referred to as adaptive beamforming.

In one aspect, the processing unit comprises a mixing unit for determining a mixing ratio based on the room characteristics and mixing a directional sound signal with an omnidirectional response signal based on the determined mixing ratio. In one aspect, the mixing ratio is continuously updated.

According to another aspect, a speakerphone for optimizing speech pickup in said speakerphone, wherein the speakerphone comprises comprising an input unit comprising a microphone system placed in a specific configuration and adapted for receiving an audio input signal and providing an electric audio input signal, an input unit for receiving an audio input signal and providing an electric audio input signal, a processing unit adapted for by using an algorithm for focusing and steering a selected target sound pickup direction towards a desired direction, and an output unit for providing an output signal perceivable by a user as sound representative of said electric acoustic input signal or a processed version thereof.

A communication device, comprising a loudspeaker system as described above in the detailed description, in the drawings and in the claims is furthermore provided.

An article of manufacture may implement a communication device comprising
  a first microphone signal path comprising
    a microphone unit,
    a first signal processing unit, and
    a transmitter unit
    said units being operationally connected to each other and configured to transmit a processed signal originating from an input sound picked up by the microphone, and
  a second loudspeaker signal path comprising
    a receiver unit,
    a second signal processing unit, and
    a loudspeaker unit operationally
    said units being operationally connected to each other and configured to provide an acoustic sound signal originating from a signal received by the receiver unit.

Thereby a speakerphone or a headset comprising a loudspeaker system according to the present disclosure can be implemented.

The communication device may comprise at least one audio interface to a switched network and at least one audio interface to an audio delivery device. The (one way) audio delivery device is a music player or any other entertainment device providing an audio signal. The (loudspeaker system of the) communication device may be configured to enter or be in the first, full bandwidth mode, when connected via the audio interface to a (one way) audio delivery device. The (loudspeaker system of the) communication device may be configured to enter or be in the second, limited bandwidth mode, when connected via the audio interface to a communication device for establishing a (two way) connection to another communication device via a switched network. Alternatively, such changes of mod can be initiated via a user interface of the communication device.

The communication device may comprise a speakerphone or a mobile (e.g. cellular) telephone (e.g. a SmartPhone) or a headset or a hearing aid.

The communication device may comprise a headphone or a gaming device.

The loudspeaker system may for example be used in a telephone conference, where the audio gateway may be a laptop, or a smartphone connected to an internet network or a telephone network via the first communication link.

Conference calls are a more sustainable approach to collaboration with colleagues across geographic locations. This means that the quality and reliability of conference solutions is vital to support productive virtual meetings.

A meeting room speakerphone has two primary functions. It must broadcast remote speech through a loudspeaker, and capture speech in the meeting room while conveying it to remote participants. Ideally, the speakerphone must convey speech as intelligibly as possible. This means sound from the loudspeaker, broadcasted into the meeting room, must be prevented from returning to the remote listener through the speakerphone's own microphone. This is achieved through a process known as "echo cancellation". Quality speakerphones also isolate voices from both ambient noise and reverberation, which greatly affect speech intelligibility for remote participants.

Noise and Reverberation

Figure 5A:
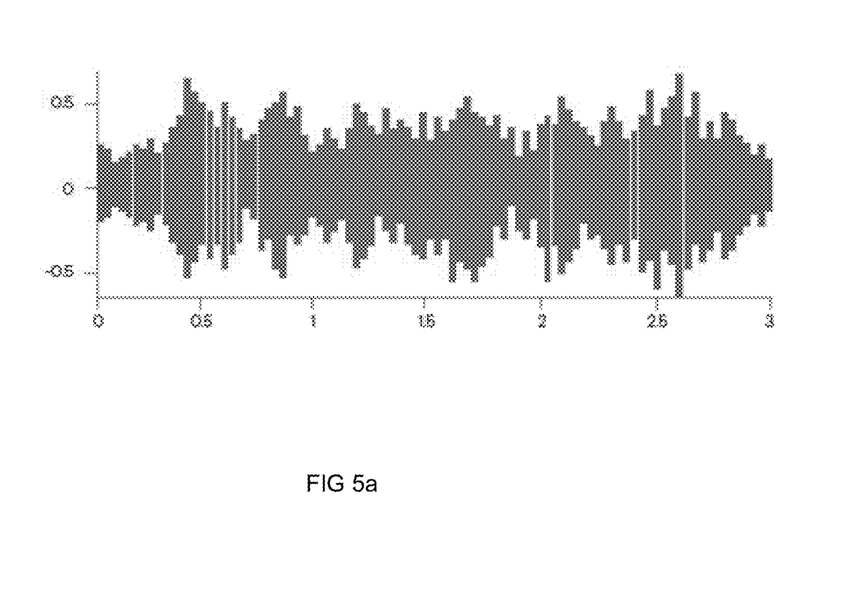
FIG. 5*a* shows an exemplary waveform of unintelligible speech.
Figure 5B:
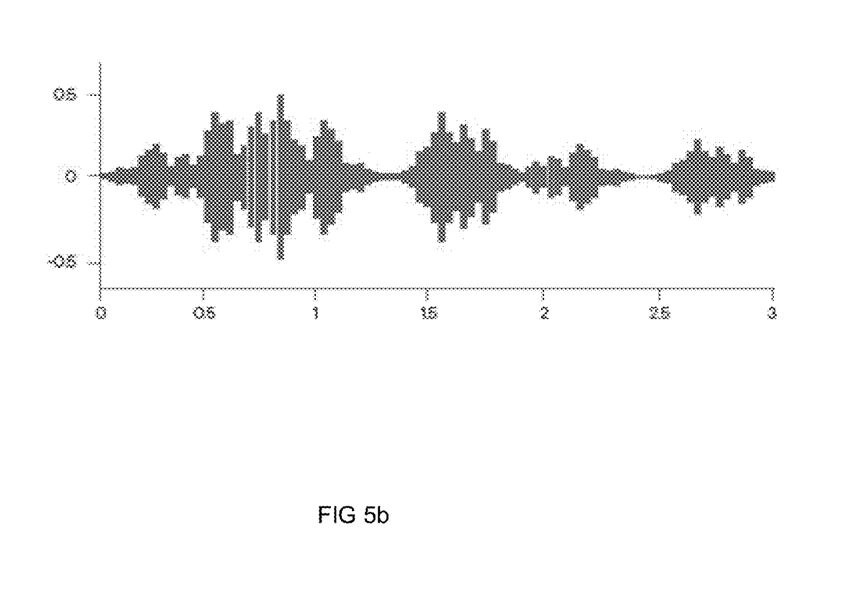
FIG. 5*b* shows an exemplary waveform of clean speech.

Speech becomes more difficult to understand in a noisy environment, as shown in FIG. 5a. So, it is essential to find a way to ensure that the ratio of speech to noise received by any remote listener is weighted in favor of speech, as in the waveform shown in FIG. 5b.

Direct and Reflected Signals

Figure 6:
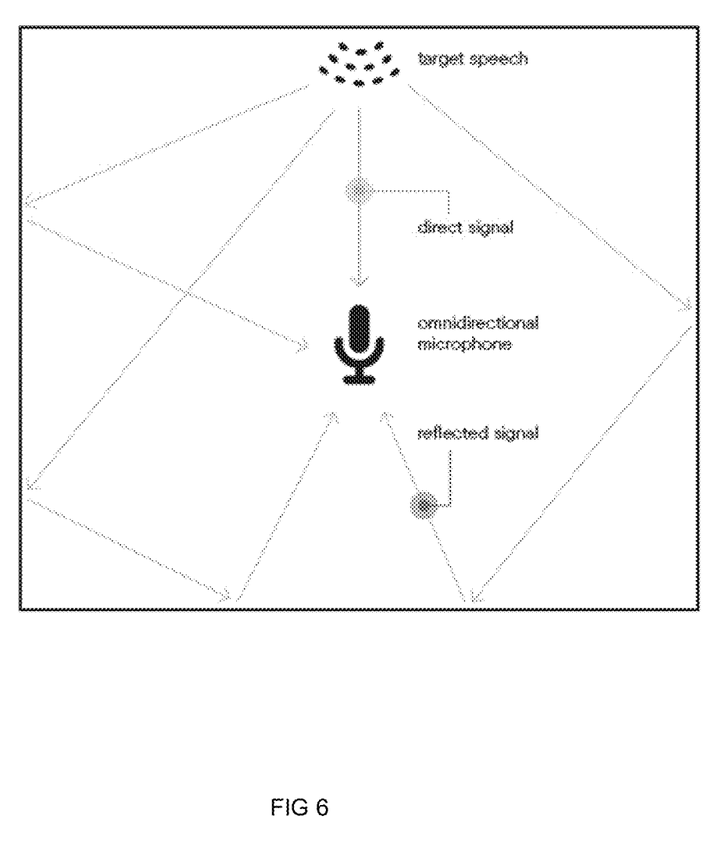
FIG. 6 shows exemplary direct & reflected signals arriving at a microphone.

A microphone picking up speech in a room will first pick up the voice—a sound which initially arrives at the microphone directly from the person speaking. This microphone will then pick up a series of additional sound, as the voice is reflected from the room's walls, ceiling and floor. Unlike the voice, which is not reflected, these sounds arrive at the microphone from all directions, as shown in FIG. 6.

The difference between direct and reflected signals arriving at a microphone are a question of time and strength—reflected sounds arrive later than direct sounds (at different 'phase'), and they arrive with less energy (or 'amplitude').

Figure 7A:
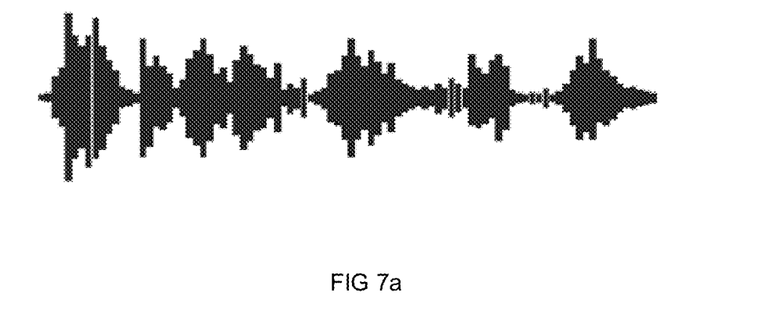
FIG. 7*a* shows an exemplary waveform of direct signal.
Figure 7B:
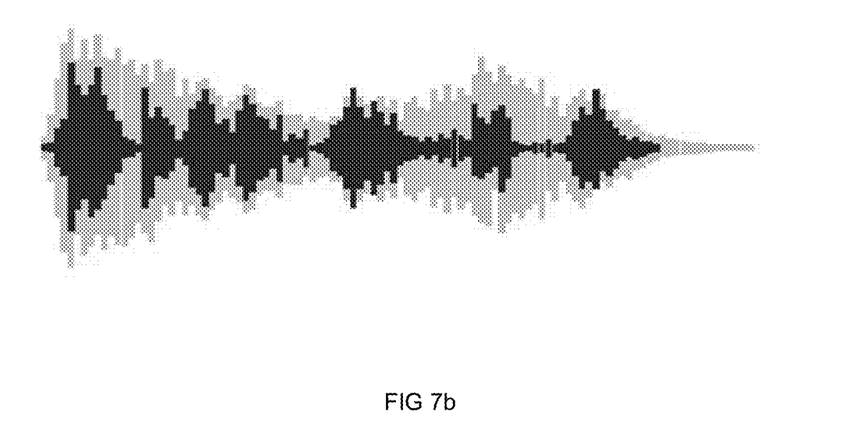
FIG. 7*b* shows an exemplary waveform of direct signal, as shown in FIG. 7*a*, & reverberation signals.

When a microphone receives direct and reflected sound at a similar level, the effect is a 'blurring' of the signal conveyed to the remote listener. This affects the intelligibility of speech. For small meeting room (2-6 persons), this is perceived by the remote listener as if the speaker was standing in a bathroom. The waveform shown in FIG. 7a represent a signal arriving directly at the microphone from the source. The waveform shown in FIG. 7b is the same signal as shown in FIG. 7a with the source sound reverberating in the room.

To overcome noise and reverberation in a typical meeting room, the ideal speakerphone would use a microphone more sensitive to the direction of speech than to the direction of sources of noise and reverberation. This is known as a 'directional' microphone.

Figure 8A:
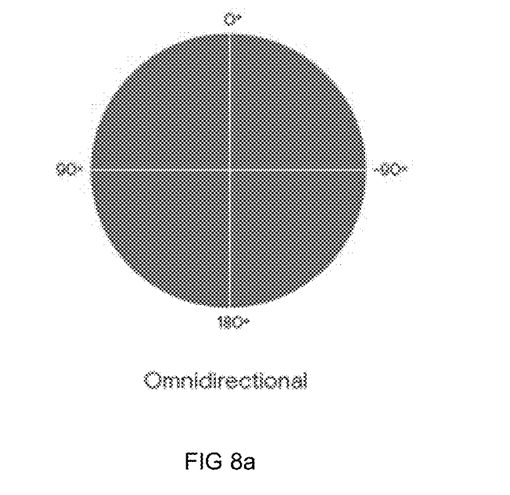
FIG. 8*a* shows an omnidirectional microphone pickup pattern.
Figure 8B:
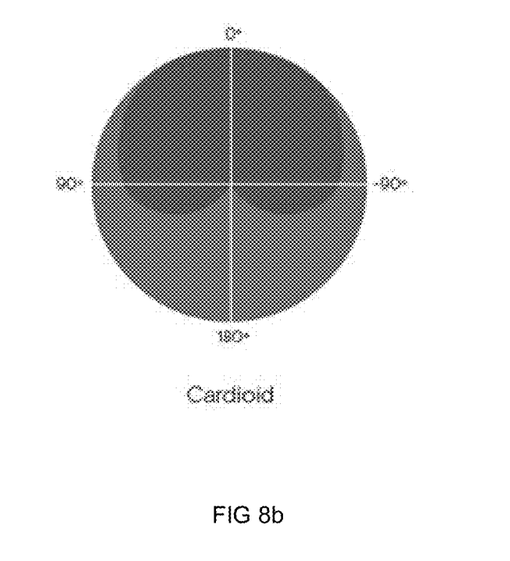
FIG. 8*b* shows a bidirectional microphone pickup pattern.

All microphones are designed with a certain 'pickup pattern', determined how directional a microphone is to sound arriving from any specific direction. These vary between omnidirectional patterns, as shown in FIG. 8*a*, (equally sensitive to sound from any direction) to bi-directional, as shown in FIG. 8*b*, (sensitive to sound from two directions). Of these pickup patterns, the simplest and most commonly available is the omnidirectional microphone.

Producing Directional Pickup from Omnidirectional Microphones

Figure 9:
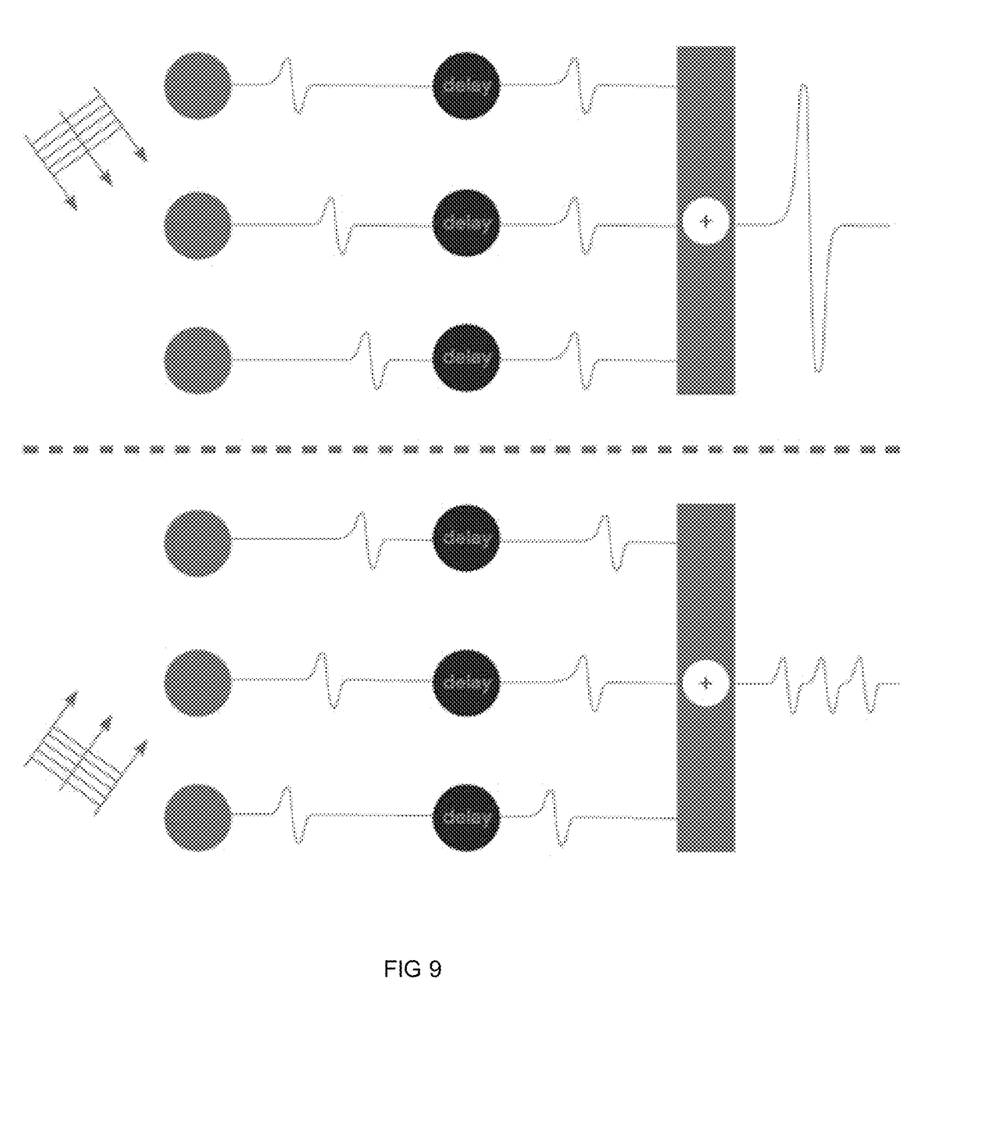
FIG. 9 shows a 'Delay & Sum' beamformer system.
Figures 10, 10B:
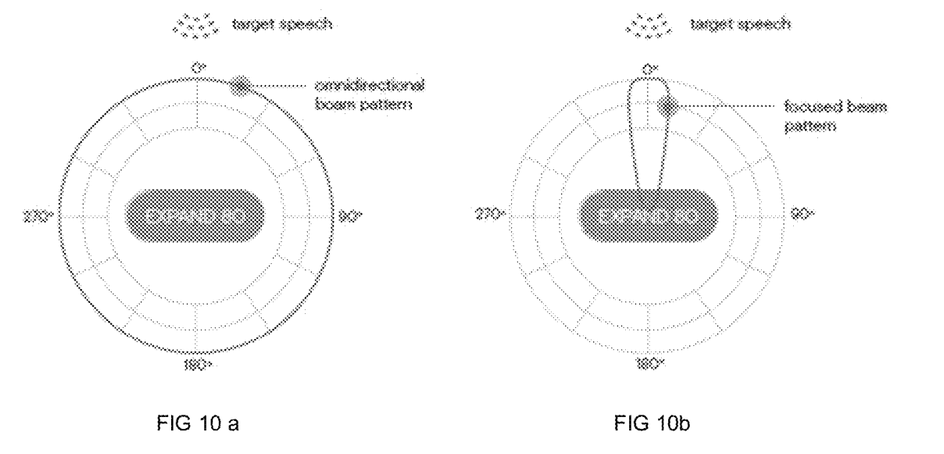
FIG. 10*b* shows a focused beam pickup pattern.
Figures 10C, 10D:
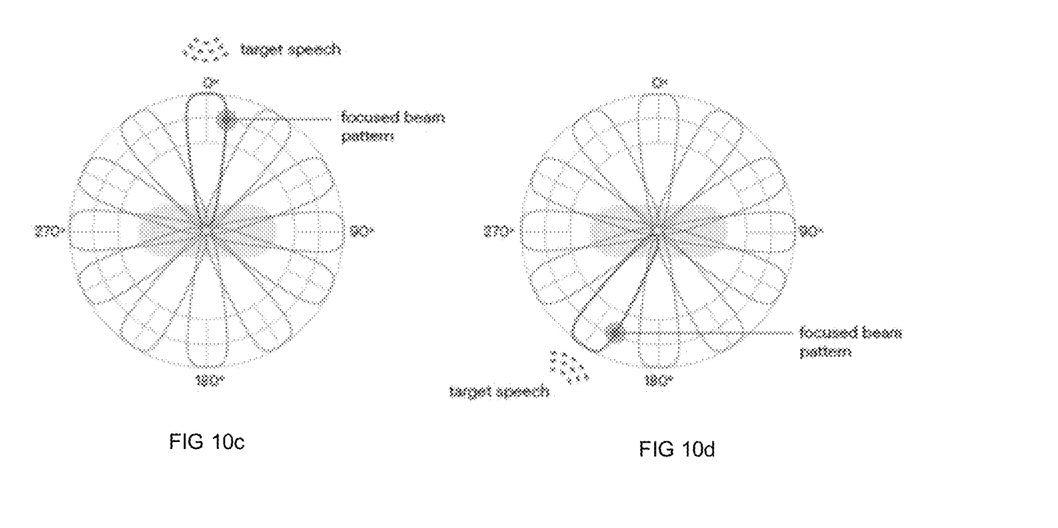
FIG. 10*c* shows a focused beam steered to 0°.
FIG. 10*d* shows a focused beam steered to 210°.

It is possible to produce a focused and directional pickup of sound from a series of omnidirectional microphones. By configuring these microphones in such a way that differences between the amplitude and the phase of their signals can be manipulated, it is even possible to focus and re-focus the array in any direction, producing the effect of an adaptable directional microphone. This is known as a microphone array beamformer. FIG. 9 shows a diagram showing the functioning of a simple beamforming system known as a 'Delay and Sum' beamformer.

The Function of 'Delay and Sum' Beamformer

In the 'Delay and Sum' beamformer configuration sound arrives at the array on an angle on the left. On account of its angled arrival, sound reaches the array's microphones at different times. These differences in time are determined by the amount of distance between the microphones.

By introducing specific delays to each microphone, it is possible to align the signals in such a way so as to synchronize them and to focus on sound coming from a certain direction. The process is known as 'constructive interference'. By adjusting these delays, it is possible to virtually 'steer' the array to 'focus' on sound arriving from any specific direction. The geometry of the array and the precise amount of delay must be carefully designed if the system is to function accurately and flexibly.

In the speakerphone of the present disclosure, six low-noise digital MEMS microphones are placed in a specific configuration optimized to enable speech to be picked up from any angle, relative to the speakerphone system. Without signal processing, the speakerphone would work as an omnidirectional microphone. When all six microphones are engaged and the advanced signal processing algorithms are applied, however, the directional pattern is focused into a tight beam.

Focusing on Speech

A focused, steerable beam like this is useful for optimizing the target sound while simultaneously rejecting sound coming from other directions, allowing the pickup of speech from any angle desired, relative to the speakerphone system. The system is capable of analyzing the content in all directions and automatically selecting the direction of interest.

In FIG. 10*a-d*, it can be seen that, even if the target speech signal changes position, (e.g. when two different people are present in a meeting room), the speakerphone will automatically steer a focused beam to the desired direction for the target signal.

Stationary Noise Reduction

Using a certain number of beams to cover the entire 360° in the horizontal plane, each individual beam can be tightly focused. Sounds arriving from the same direction that the beam is pointing in will be picked up without any change, as compared with an omnidirectional microphone. Sounds arriving from other angles, meanwhile, are greatly attenuated—that is, diminished.

Active De-Reverberation

As we have seen, reverberation causes sounds to arrive at a speakerphone's microphone with additional delay and from additional angles. This results in a blurring of the signal in time, reducing the intelligibility of speech.

Figure 11:
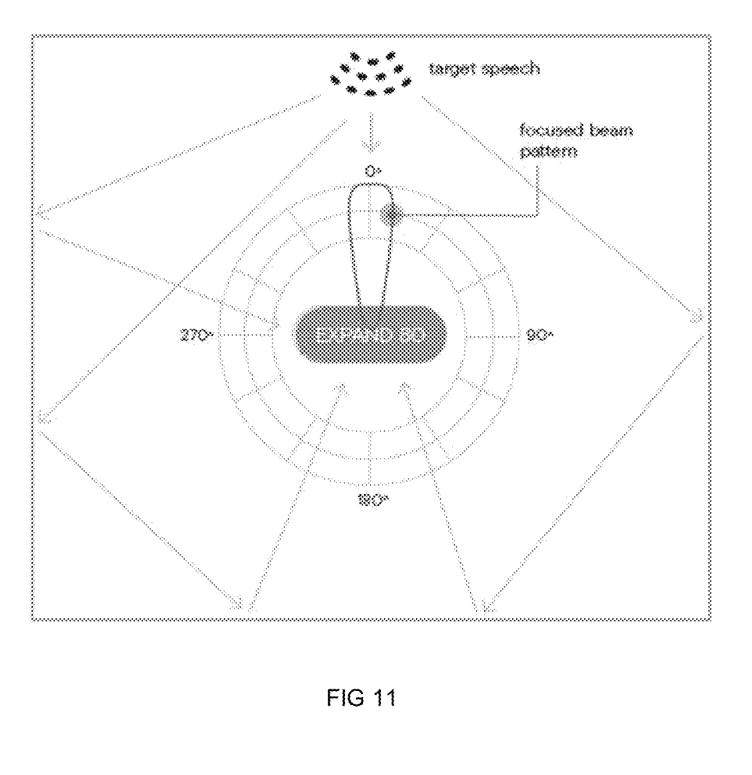
FIG. 11 shows a focused beam pickup pattern.

An optimal ratio of speech to reverberated sound is maintained through the use of a beam focused in the direction of the target signal. Sounds arriving at an angle, reflected from the room's surfaces, will be conveyed with attenuation, in comparison to the target signal, as shown in FIG. 11.

In an aspect, a headset or headphone comprising a loudspeaker system as described above in the detailed description, in the drawings and in the claims is furthermore provided.

The loudspeaker system according to the present disclosure is in general applicable in any device or system comprising a specific electroacoustic system (e.g. including a loudspeaker and a mechanical parts in communication with the loudspeaker) with a resulting transfer function, which (at a specific sound output) exhibits a low frequency and/or high frequency drop-off (as schematically shown for a loudspeaker unit in FIG. 3*c*). The application of a loudspeaker system according to the present disclosure may advantageously contribute to a compensation for loss of low and/or high frequency components of the sound output to the environment (e.g. due to leakage).

In a headset or headphone, the drop-off is primarily determined by the electroacoustic system (including A. the loudspeaker design, and B. the ear-cup/ear pad/ear bud/earpiece design).

The headphone or headset may be of the open type (indicating a certain or substantial exchange of sound with the environment). The headphone or headset may be of the closed type (indicating an aim to limit the exchange of sound with the environment).

The term open may in the present context be taken to mean that a relatively high acoustic leakage between the surrounding environment and a volume limited by to the ear/ear canal/ear drum and an ear cup/ear pad/ear bud of the headset or head phone covering or blocking the ear/ear canal. In a closed type headphone or headset, the leakage will be (substantially) less than in an open type (but some leakage will typically be present; and this leakage can be compensated for by a loudspeaker system according to the present disclosure).

The headphone or headset may comprise an active noise cancellation system.

In a further aspect, use of a loudspeaker system as described above in the detailed description below, in the drawings. Use in a speakerphone, or a mobile (e.g. cellular) telephone (e.g. a SmartPhone), or a gaming device, or a headphone, or a headset, or a hearing aid is provided.

The communication device may be portable device, e.g. a device comprising a local energy source, e.g. a battery, e.g. a rechargeable battery. The hearing assistance device may be a low power device. The term 'low power device' is in the present context taken to mean a device whose energy budget is restricted, e.g. because it is a portable device, e.g. comprising an energy source, which—without being exchanged or recharged—is of limited duration (the limited duration being e.g. of the order of hours or days).

The communication devices may comprise an analogue-to-digital converter (ADC) to digitize an analogue input with a predefined sampling rate, e.g. 20 kHz. The communication device may comprise a digital-to-analogue converter (DAC) to convert a digital signal to an analogue output signal, e.g. for being presented to a user or users via an output transducer.

The frequency range considered by the communication device may be from a minimum frequency $f_{min}$ to a maximum frequency $f_{max}$ and may comprise a part of the typical human audible frequency range from 20 Hz to 20 kHz, e.g. a part of the range from 20 Hz to 12 kHz.

In particular, the communication device may comprise a voice detector (VD) for determining whether or not an input signal comprises a voice signal (at a given point in time). Such detector may aid in determining an appropriate mode of operation of the loudspeaker system The communication device may comprise an acoustic (and/or mechanical) feedback suppression system. The communication device may further comprise other relevant functionality for the application in question, e.g. compression, noise reduction, etc.

The communication device may comprise a cellular telephone or a speakerphone. The communication device may comprise or be a listening device, e.g. an entertainment device, e.g. a music player, e.g. a hearing aid, e.g. a hearing instrument, e.g. a headset, an earphone, an ear protection device or a combination thereof.

When the loudspeaker system are headphones, then the advantage of the present disclosure is that an audio signal comprising music, or any sound can be easily distributed between the communication unit.

The audio signal being transmitted via the communication link may comprise speech or speeches from one or more users of another audio gateway connected to the other end of the first communication link. Alternatively, the audio signal may comprise music. In this example, the music may then be played on the communication units simultaneously.

A hearing device may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include arranging a unit of the hearing device behind the ear with a tube leading air-borne acoustic signals into the ear canal or with a receiver/loudspeaker arranged close to or in the ear canal such as in a Behind-the-Ear type hearing aid, and/or arranging the hearing device entirely or partly in the pinna and/or in the ear canal of the user such as in an In-the-Ear type hearing aid or In-the-Canal/Completely-in-Canal type hearing aid, or arranging a unit of the hearing device attached to a fixture implanted into the skull bone such as in Bone Anchored Hearing Aid or Cochlear Implant, or arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a Smartphone or other electronic device, the Smartphone/electronic device possibly running an application that controls functionality of the at least one hearing device.

In general, a hearing device includes an input unit such as a microphone for receiving an acoustic signal from a user's surroundings and providing a corresponding input audio signal, and/or a receiving unit for electronically receiving an input audio signal.

The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneous or percutaneous to the skull bone or a vibrator for providing a structure-borne or liquid-borne acoustic signal. In some hearing devices, the output unit may include one or more output electrodes for providing the electric signals such as in a Cochlear Implant.

Further objects of the application are achieved as defined in the dependent claims and in the detailed description of the disclosure.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 10*a* shows an omnidirectional pickup pattern.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In general, a hearing device includes i) an input unit such as a microphone for receiving an acoustic signal from a user's surroundings and/or the user's own voice and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

Figure 1:
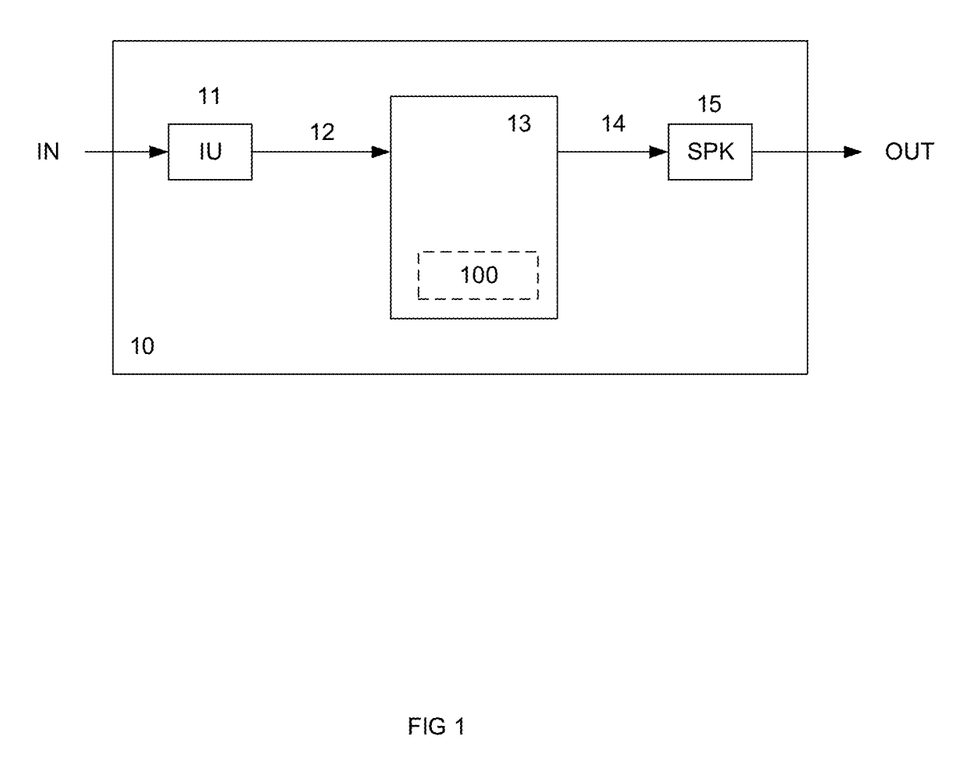
FIG. 1 shows a hearing device/loudspeaker system according to the present disclosure.

FIG. 1 shows a loudspeaker system 10 an input unit IU providing an electric input audio signal eIN based on input signal IN. Input signal IN may e.g. be an acoustic signal from the environment (in which case input unit IU comprises a microphone), or an electric signal received from a component of the loudspeaker system or from another device, or a mixture thereof. The input unit IU comprises an audio interface. The input signal IN may (in case it is an electric signal) be an analogue signal (e.g. an audio signal from an audio jack interface) or a digital signal (e.g. an audio signal from a USB audio interface). The input unit 11 (IU) may e.g. comprise an analogue to digital converter (ADC) to convert an analogue electric signal to a digital electric signal (using an appropriate audio sampling frequency, e.g. 20 kHz). The loudspeaker system 10 further comprises a processing unit 13 for modifying the electric input audio signal 12 (eIN) (or a processed version thereof) according to a predefined optimization function 100. The loudspeaker system 10 further comprises a loudspeaker unit 15 (SPK) for converting the optimized electric audio signal 14 (eINeq) to an acoustic output sound signal OUT. The loudspeaker unit 14 (SPK) may alternatively be a mechanical vibrator of a bone anchored hearing device. In a particular mode of operation of the loudspeaker system 10, the processing unit 13 is configured to apply a specific optimization function to the electric input audio signal.

Figure 2:
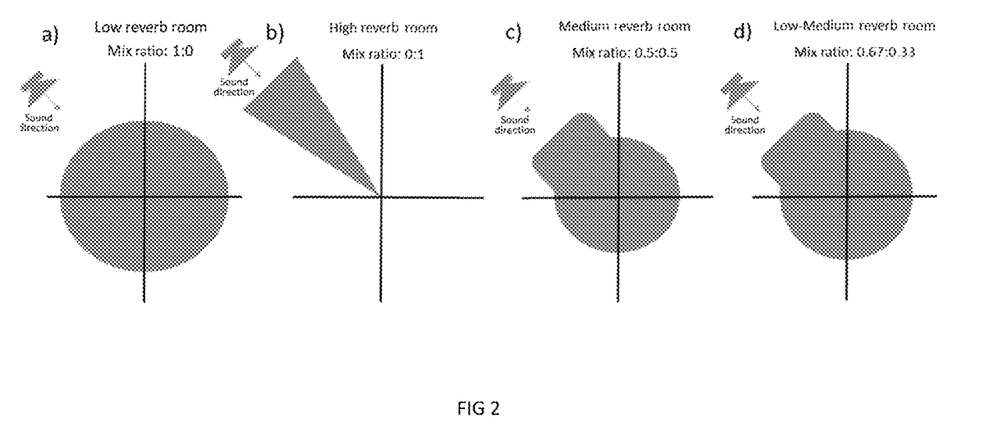
FIG. 2 shows room properties for a loudspeaker system according to the present disclosure.

FIG. 2 shows different room properties in which the microphone system is used. In the room in FIG. 2*a*, the room is a low-reverberation room, and the mixing ratio is chosen as 1:0, i.e. all omnidirectional input. In the room for FIG. 2*b*, the room is a highly reverberant room, and the mixing ratio is chosen to be 0:1, ie. all directional so as to focus maximally towards the source. In the room for 2*c*, the room is a medium reverberant room where the mixing ratio is chosen to be 0.5:0.5, i.e. a 50% mix of directional and omnidirectional input. This yields a combined directional pattern as outlined in the figure. In the room for FIG. 2*d*, the room is low-medium reverberant, i.e. not as reverberant as room 2*c*, but more than in FIG. 2*a*. Here the mixing ratio is set to 0.67:0.33, i.e. more of the omnidirectional signal is used than the directional signal, yields a slightly more round directional pattern as shown in FIG. 2*d*. As indicated in FIG. 2*d*, two or more digits may be desirable. Here the omnidirectional signal will be roughly weighted with 2/3 and the directional signal will be weighted with 1/3 and would fit a low-medium reverb room.

Figure 3:
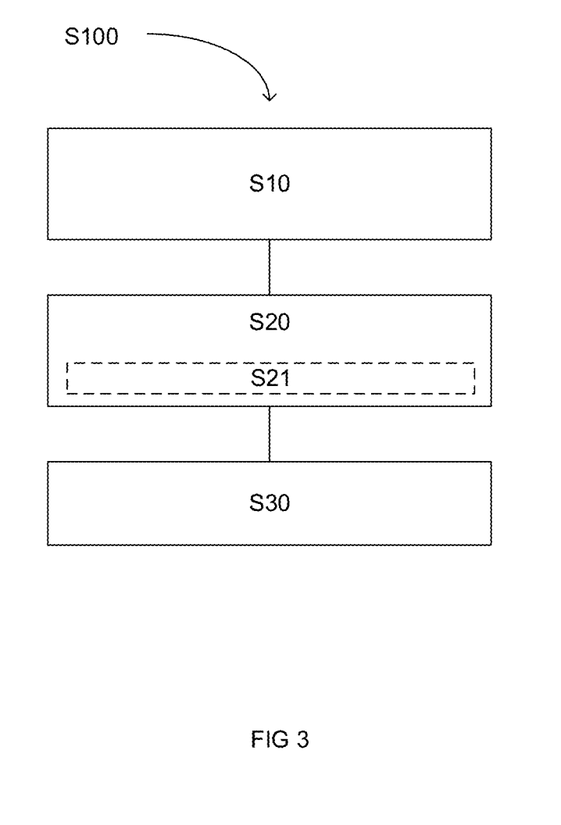
FIG. 3 shows a simplified block diagram for optimizing microphone signals in a room according to the present disclosure.

FIG. 3 shows a method S100 for optimizing the microphone signal performance based on room properties as shown in FIG. 2. The method comprising the steps of receiving S10 acoustic input signals 12, processing S20 said acoustic input signals by using an algorithm 100 for optimizing the microphone signal performance and transmitting S30 and output signal 13 based on said processed input signal.

The processing further comprises steps of mixing S21 the beams with an omni response to some ratio determined by the room properties.

1. In a hard room maximum directionality is wanted. This is achieved by mixing omni/beam in a close to 0:1 relationship.
2. In a very soft room the full (or close to) omni directional response is preferred. This is achieved by an opposite mix of 1:0.
3. In rooms between these extremes the mixture will be in between.

One way of achieving this is to assess the coefficients in an echo canceller (also present in the device) filter as they strongly correlates with the room reverb and use this information to select a mix between e.g. directional filters and omni directional pickup pattern having the optimal tradeoff between reverb and noise.

By using an array of microphones both a directional, omni and enhanced omni system can be realized.

A concrete example could be to use a microphone array with 6 microphones to generate 6 pickup beams and one enhanced omnidirectional "beam".

Figure 4A:
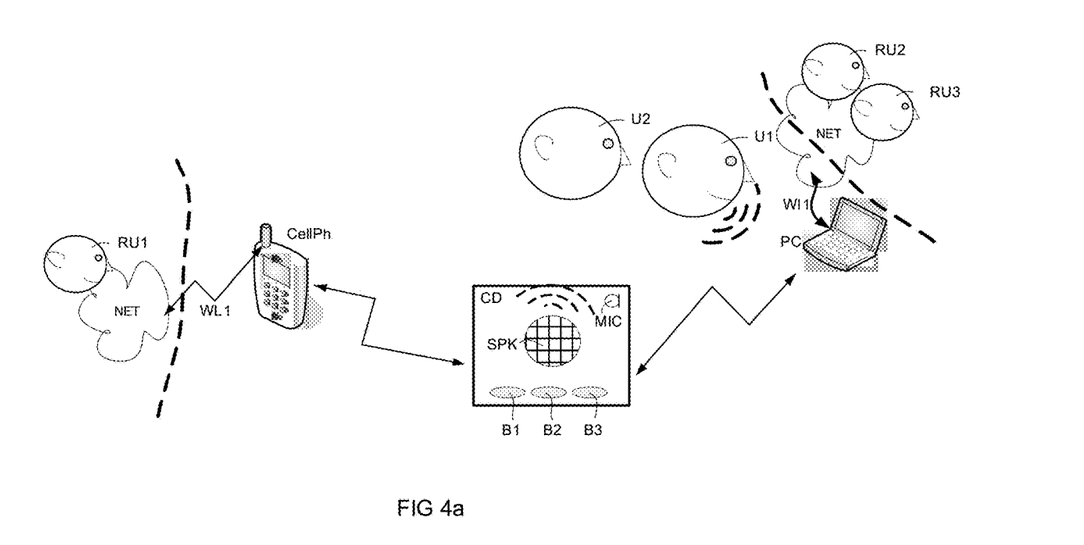
FIG. 4*a-b* shows two application scenarios of a speakerphone or a headset comprising a loudspeaker system according to the present disclosure.

FIG. 4a shows a communication device CD comprising two wired or wireless audio interfaces to other devices, a) a wireless telephone (CellPh, e.g. a cellphone, e.g. a Smartphone, FIG. 4a) or a one-way audio delivery device (Music player in FIG. 4b), and b) a computer (PC, e.g. a PC). The audio interface to the computer (PC) maybe wireless or a wired, e.g. an USB (audio) interface including a cable and an USB-connector, for connecting the communication device to the computer and allowing two-way audio to be exchanged between the communication device CD and the computer. The audio interface to the wireless telephone (CellPh) may comprise a cable and/or a phone connector (PhCon) for directly connecting the communication device to the computer and allowing two-way audio to be exchanged between the communication device and the computer. The communication device (CD) comprises a number of activation elements (B1, B2, B3), e.g. push buttons (or alternatively a touch sensitive display) allowing the control of functions of the communication device and/or devices connected to the communication device. One of the activation elements (e.g. B1) may be configured to allow connection (hook-off, answer call) and/or disconnection (hook-on, terminate call) of the wireless telephone (CellPh) connected to the communication device. One of the activation elements (e.g. B2) may be configured to allow a user to control the volume of the loudspeaker output. One of the activation elements (e.g. B3) may be configured to allow a user to control a mode of operation of the loudspeaker system of the communication device.

The scenario shown in FIG. 4a illustrates a teleconference between users (U1, U2) in the vicinity of the communication device (CD) and users (RU1, RU2, and RU3) at two (different) remote locations. Remote user RU1 is connected to the communication device (CD) via wireless telephone (CellPh) and wireless connection WL1 to a network (NET). Remote users RU2, RU3 are connected to the communication device (CD) via computer (PC) and wired connection WI1 to a network (NET).

Figure 4B:
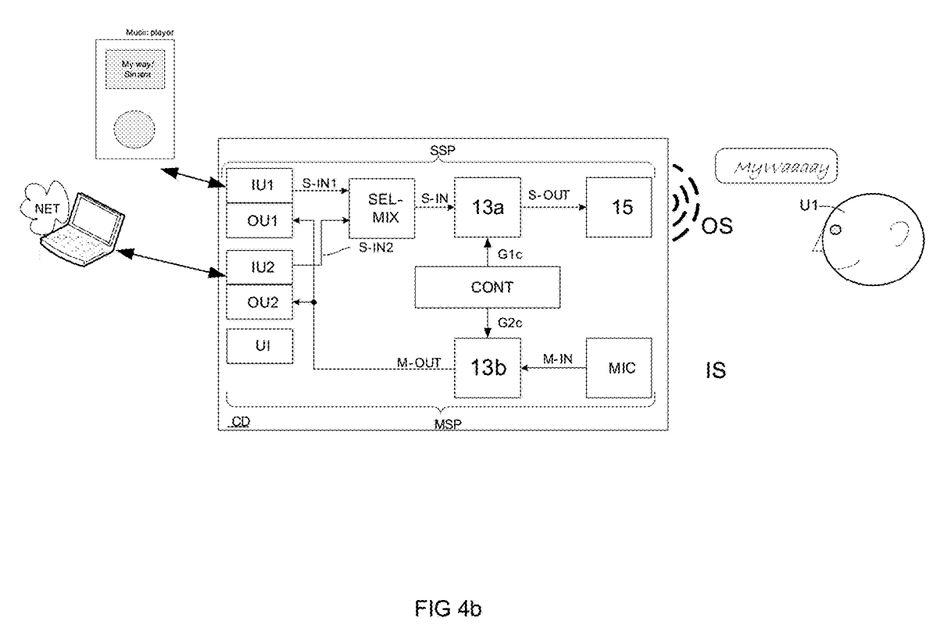

FIG. 4b illustrates a different scenario than FIG. 4a. FIG. 4b illustrates the reception (and optional mixing) of audio signals from the various audio delivery devices (Music player and PC) connected to the communication device (CD). The communication device (CD) comprises two (two-way) audio interfaces embodied in I/O units IU1/OU1 and IU2/OU2, respectively.

The communication device of FIG. 4b comprises a loudspeaker signal path (SSP), a microphone signal path (MSP), and a control unit (CONT) for dynamically controlling signal processing of the two signal paths. The loudspeaker signal path (SSP) comprises receiver units (IU1, IU2) for receiving an electric signal from a connected device and providing it as an electric received input signal (S-IN1, S-IN2), an SSP-signal processing unit 13a for processing (including equalizing) the electric received input signal (S-IN1, S-IN2) and providing a processed output signal (S-OUT), and a loudspeaker unit 15 operationally connected to each other and configured to convert the processed output signal (S-OUT) to an acoustic sound signal (OS) originating from the signal received by the receiver unit (IU1, IU2). The loudspeaker signal path (SSP) further comprises a selector-mixing unit (SEL-MIX) for selecting one of the two inputs audio signals (or mixing them) and providing a resulting signal S-IN to the SSP-signal processing unit 13a. The microphone signal path (MSP) comprises a microphone unit (MIC) for converting an acoustic input sound (IS) to an electric microphone input signal (M-IN), an MSP-signal processing unit 13b for processing the electric microphone input signal (M-IN) and providing a processed output signal (M-OUT), and respective transmitter units (OU1, OU2) operationally connected to each other and configured to transmit the processed signal (M-OUT) originating from an input sound (IS) picked up by the microphone unit (MIC) to the connected device. The control unit (CONT) is configured to dynamically control the processing of the SSP- and MSP-signal processing units 13a and 13b, respectively, including mode selection, and equalization in the SSP path.

The loudspeaker signal path (SSP) is divided in two (IU1, IU2) for receiving input signals from the respective audio devices (Music player and PC). Likewise, the microphone signal path (MSP) is divided in two (OU1, OU2) for transmitting output signals to the respective audio devices (Music player (not relevant) and PC). One-way and two-way audio connections between the communication device (units IU1, IU2 and OU1, OU2) and two the audio devices (here Music player and PC) can be established via wired or wireless connections, respectively.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A method for optimizing speech pickup in a speakerphone system, wherein the speakerphone system comprises a microphone system placed in a specific configuration, wherein the method comprising:
   receiving acoustic input signals by the microphone system,
   providing a directional output signal based on signals from said microphone system,
   providing an omnidirectional output signal based on signals from said microphone system,
   processing said acoustic input signals by determining a mixing ratio based on a room characteristic, and mixing said directional output sound signal with said omnidirectional output signal based on the determined mixing ratio, the mixing ratio defining a ratio of omnidirectional output signal to the directional output signal, the room characteristic being a reverberation level in the room in which a speakerphone is placed, the mixing ratio being selected from among at least two ratios based on the reverberation level in the room, each of the at least two ratios including a non-zero quantity of the directional output signal, and
   transmitting an output signal based on said processing.

2. The method according to claim 1, wherein the microphone system comprises at least six microphones.

3. The method according to claim 2, wherein the microphones are low-noise digital MEMS microphones are placed in a specific configuration optimized to enable speech to be picked up from any angle relative to the speakerphone system.

4. The method according to claim 1, wherein the microphone system is engaged, and the advanced signal processing algorithms are applied, and the directional pattern is focused into a tight beam.

5. The method according to claim 1, wherein the method comprises the step of
   analyzing the content of the received sound signal in all directions, and
   automatically selecting the direction of interest, the target sound signal.

6. The method according to claim 1, wherein the speakerphone is configured to steer a focused beam to the desired direction for the target signal, even if the target sound signal changes position.

7. The method according to claim 1, further comprising:
   estimating the room characteristic using a reverb estimator.

8. The method according to claim 7, wherein the method comprising continuously updating the mixing ratio based on the estimated room characteristic.

9. A system for optimizing speech pickup in a speakerphone of the system, comprising:
   an input unit comprising a microphone system placed in a specific configuration and adapted for receiving an audio input signal and providing an electric audio input signal;
   a mixing unit for determining a mixing ratio based on a room characteristic, and mixing a directional signal based on said input unit with an omnidirectional signal based on said input unit, wherein the mixing ratio is based on the determined mixing ratio, the mixing ratio defining a ratio of omnidirectional output signal to the directional output signal, the room characteristic being a reverberation level in the room in which a speakerphone is placed, the mixing ratio being selected from among at least two ratios based on the reverberation level in the room, each of the at least two ratios including a non-zero quantity of the directional output signal, and
   an output unit for providing an output signal perceivable by a user as sound representative of said electric audio input signal or a processed version thereof.

10. The system according to claim 9, wherein the microphone system comprises at least six microphones.

11. The system according to claim 10, wherein the microphones are low-noise digital MEMS microphones are placed in a specific configuration optimized to enable speech to be picked up from any angle relative to the speakerphone system.

12. The system according to claim 9, wherein a processing unit is configured for
   analyzing the content of the received sound signal in all directions, and
   automatically selecting a direction of interest comprising a target sound signal.

13. The system according to claim 10, wherein the speakerphone system is adapted to automatically adaptively steer a focused beam to a desired direction.

14. The system according to claim 10, wherein the mixing ratio is continuously updated.

15. A speakerphone for optimizing speech pickup in said speakerphone, wherein the speakerphone comprises comprising:
   an input unit comprising a microphone system placed in a specific configuration and adapted for receiving an audio input signal and providing electric audio input signals;
   a mixing unit for determining a mixing ratio based on a room characteristic, and mixing a directional sound signal obtained from said electric audio input signals with an omnidirectional signal obtained from electric audio input signals, wherein the ratio of the signals are based on the determined mixing ratio, the mixing ratio defining a ratio of omnidirectional output signal to the directional output signal, the room characteristic being a reverberation level in the room in which a speakerphone is placed, the mixing ratio being selected from among at least two ratios based on the reverberation level in the room, each of the at least two ratios including a non-zero quantity of the directional output signal, and an output unit for providing an output signal perceivable by a user as sound representative of said electric audio input signal or a processed version thereof.

16. The speakerphone according to claim 15, wherein the microphone system comprises at least six microphones.

17. The speakerphone according to claim 16, wherein the microphones are low-noise digital MEMS microphones are placed in a specific configuration optimized to enable speech to be picked up from any angle.

18. The speakerphone according to claim 15, wherein a processing unit is adapted for analyzing the content of the received sound signal in all directions, and automatically selecting the direction of interest, and providing an adaptive directional beamformed signal.

19. The speakerphone according to claim 15, wherein the speakerphone system is adapted to automatically steer a focused beam adaptively to a desired direction.

20. The speakerphone according to claim 15, wherein the mixing ratio is continuously updated.

21. The method according to claim 1, wherein when the room is determined as a medium reverberant room the mixing ratio is chosen to be 0.5:0.5, and when the room is determined to be a low-medium reverberant room, the mixing ratio is set to 0.67:0.33.

22. The system according to claim 9, wherein when the room is determined as a medium reverberant room the mixing ratio is chosen to be 0.5:0.5, and when the room is determined to be a low-medium reverberant room, the mixing ratio is set to 0.67:0.33.

23. The speakerphone according to claim 15, wherein when the room is determined as a medium reverberant room the mixing ratio is chosen to be 0.5:0.5, and when the room is determined to be a low-medium reverberant room, the mixing ratio is set to 0.67:0.33.

* * * * *